Jan. 2, 1951 R. N. TURNER 2,536,969
PROTECTIVE PLUG GAUGE HOLDER
Filed Oct. 20, 1943

INVENTOR.
Robert Nixon Turner.
BY
ATTORNEYS.

Patented Jan. 2, 1951

2,536,969

UNITED STATES PATENT OFFICE 2,536,969

PROTECTIVE PLUG GAUGE HOLDER

Robert N. Turner, Ferndale, Mich.

Application October 20, 1943, Serial No. 507,053

6 Claims. (Cl. 33—178)

This invention relates to improvements in plug gauges.

The primary object of this invention is the provision of a plug gauge which is relatively simple in construction and in which the gauge pins or rods are securely supported in a casing in a protected relation and in such manner that they can be ground to recondition them for gauging purposes over a long period of time under conditions of constant use.

A further object of this invention is the provision of improved means for supporting gauge pins or rods in a casing.

A further object of this invention is the provision of an improved plug gauge having improved means for the mounting of a "go" gauge and "no-go" gauge, in a relation to facilitate gauging operations.

Other objects and advantages of this invention will be apparent during the course of the following detailed description.

In the drawing, wherein similar reference characters designate corresponding parts throughout the several views.

Figure 1:
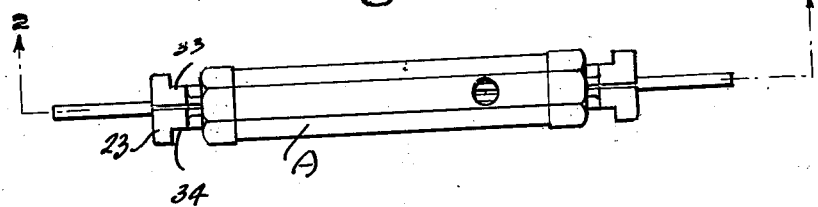
Figure 1 is a side elevation of the plug gauge.

In the drawing, wherein for the purpose of illustration is shown only a preferred embodiment of the invention, the letter A may generally designate the improved plug gauge. It consists of a casing B, gauge pins, rods or members C and D, and collets or sleeves E for the mounting of said gauges in the casing B.

The casing or supporting handle B is preferably made of rigid plastic material, metal, wood, or fibre. It is elongated and of polygonal, round, square, oval, or otherwise cross section. In the example shown it is hexagonal and provided with a cylindrical bore 10 extending longitudinally therethru and tapered at both ends; the tapered ends being the same. This bore is preferably of uniform diameter, the tapered ends being the same taper as collet E. The casing at its ends is provided with metallic ferrules 11 to protect the ends of the plastic material; the ferrules having openings therethru slightly larger than the bore 10 so as not to obstruct the admission of the collet E thru the bore 10, as is clearly shown in Figure 3 of the drawing.

The gauge rods C and D may be of any desired length, depending upon the size and nature of the gauge. They extend axially thru the casing B and project therefrom, so that each gauge rod or member is of a considerable length. This is for the purpose of using these gauge rods over a long period of time, since they can be ground off should the use end thereof become damaged or undersized for any reason. The gauge rod C is known as the "go" gauge and the rod D is known as the "no-go" gauge. The latter is slightly larger in diameter than the "go" gauge for a purpose to be hereinafter discussed.

The collets E are for the purpose of detachably supporting the gauge rods C and D in the casing B. They are preferably of synthetic resin or other hard plastic material, metal, wood, or fibre, which is softer or more ductile than the gauge rods C and D, so as not to injure the latter by marring the same under any circumstances whatsoever. The collet or sleeve E consists of a tapered body 20 externally tapered at 21 from the outer headed end 23 to the inner end 24. The taper is uniform. The sleeve or collet E is longitudinally split at 30 thruout the length thereof so that it may be transversely contracted. It is provided with an axial passageway or bore 31 therethru of a uniform diameter thruout the length thereof, depending upon the extent of contraction of the collet; the said passageway 31 being for the purpose of receiving one of the gauge rods C or D. The headed end 23 is enlarged in cylindrical fashion and partially flattened at opposite sides (see surfaces 33 and 34) for the purpose of receiving a wrench or pair of pliers to facilitate removal of the collet from the casing should the same become too tightly wedged therein.

One of the improved features of the collet E is that the same is flattened at 40 thruout the length thereof from the head 23 to the end 24 directly at the split 30 and in a plane normal to the plane of the split or slot 30. These flat surfaces in reality form segmental chord surfacing. At a direct opposed diametrical location the sleeve body 20 is also flattened at 41 in a plane parallel with the flat surface 40 and from the head 23 to the end 24.

Figure 2:
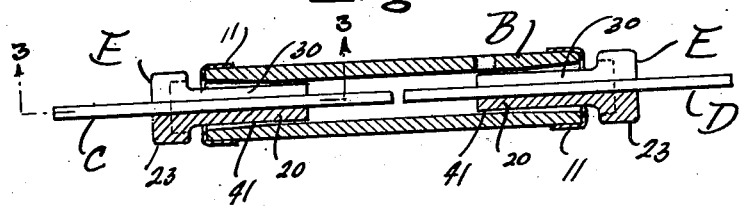
Figure 2 is a longitudinal cross-sectional view of the plug gauge taken on the line 2—2 of Figure 1.
Figure 3:
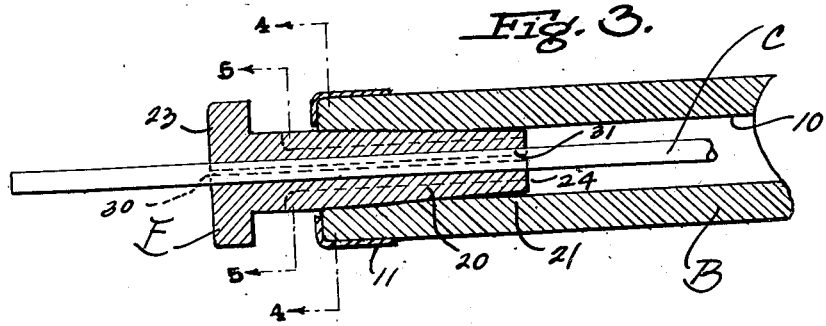
Figure 3 is an enlarged section of one end of the plug gauge taken on the line 3—3 of Figure 2.
Figure 4:
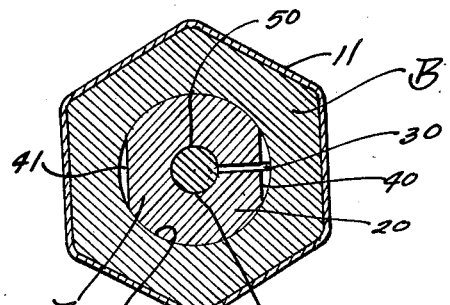
Figures 4 and 5 are transverse sectional views taken on the respective lines in Figure 3.
Figure 5:
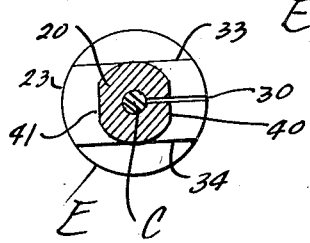

Referring to the complete assemblage of the plug gauge, the "go" gauge and the "no-go" gauge are respectively assembled in their collets E in the position shown in Figure 2 so that sufficient of the gauge rods extend from their respective collets for proper gauging operations. The collets or sleeves E are then inserted in opposite ends of the casing B and forced into position in the bore 10. Such operation will cause lateral contraction of the body 20 of the collets on their respective gauge rods and will firmly clamp said gauge rods in the casing in axially aligning relation for proper gauging operations. It will be noted from Figure 2 that the flat sides of the collets do not contact the bore surface 10 at the tapered ends, and it is only the outer surfaces of the collets which do engage the tapered ends of the casing B, as shown in Figure 3. Flattened surfaces 40 and 41 facilitate the compression of the opposite halves of the gauge body 20 upon the gauge rod, since they can fulcrum more readily at the surface 41; the points of maximum pressure of the split sleeve upon the gauge rods taking place at the points designated at 50 in Figure 4 of the drawing.

It will be readily understood from the foregoing that the gauge rods are securely locked in the collets or sleeves. In position with the outer ends protruding, the inner ends are in closely spaced relation as shown in Figure 2. The assemblage is very simple and to remove the gauge rods it is merely necessary to loosen the collets from the casing either manually or by means of a wrench or pair of pliers. The fact that the "go" gauge and "no-go" gauge are assembled upon the same casing but in opposed axially aligning relation facilitates gauging operations.

In actual use for the gauging of a machined hole, the "go" gauge will of course exactly fit the hole, and the "no-go" gauge being oversize, if it can be inserted in the opening, the bore is of too large diameter. In the drawing the size of the gauge rods look to be about the same. That is true because the diameters of these gauge rods vary so slightly as to be imperceptible to the naked eye. For instance, in one type of gauge the diameter of the "go" gauge may be .250 plus .0004 for the testing of an opening, the diameter of which is .250 plus .0005. The diameter of the "no-go" gauge would be .251 plus 0 minus .0004.

Various changes may be made to the shape, size and arrangement of parts without departing from the spirit of the invention or the scope of the following claims.

I claim:

1. As an article of manufacture a plastic, gauge rod clamping sleeve for plug gauges comprising a tapered sleevelike body having an external taper and a gauge rod receiving passageway therethru, said body being longitudinally split from end to end to permit compression of the sleeve upon the gauge rod, the body in any plane normal to the axis of the sleeve for the major length of the sleeve being of less radius at the slot and also diametrically opposed thereto than the radial dimension of the sleeve in a plane normal to the split of the sleeve.

2. In a plug gauge the combination of a casing having an opening therein, a split tapered sleeve having an external convex surface adapted to be inserted in said opening, and a gauge rod supported in said sleeve and clamped therein as an incident of insertion of the tapered sleeve in said casing, the said sleeve at said split and diametrically opposed thereto having segmental chord surfaces so as to permit contraction thereof as it is inserted in said casing whereby greater pressure is brought to bear upon the gauge rod for holding the latter securely in place in the casing and in the sleeve.

3. In a plug gauge the combination of an elongated plastic casing having a passageway therethru which tapers at an end thereof, a metal ferrule over the end of said casing to prevent damage to the plastic material thereof, said ferrule having an opening to the tapered passageway of the casing, a plastic collet having a gauge rod receiving passageway therealong, said collet being split longitudinally thereof and being externally tapered for fitting into the end tapered passageway of said casing for contracting said collet upon a gauge rod supported in the passageway thereof, the external surface of said collet longitudinally at certain locations having the extreme external surfacing flattened.

4. In a collet structure for holding such devices as gauge rods and the like the combination of a split sleeve having a receiving passageway longitudinally therein, the split extending from said passageway to the external surface of said collet, said collet being tapered externally therealong and the collet along said taper being flattened directly at said split in a plane substantially normal to the split and also being flattened therealong diametrically opposed to said split and in a plane substantially normal to said split.

5. In a collet structure for holding such devices as gauge rods and the like the combination of a split sleeve having a receiving passageway longitudinally therein, the split extending from said passageway to the external surface of said collet, said collet being tapered externally therealong and the collet along said taper being flattened directly at said split in a plane substantially normal to the split and also being flattened therealong diametrically opposed to said split and in a plane substantially normal to said split, said collet externally on its end having an enlarged externally polygonally-shaped finger engaging flange.

6. As an article of manufacture a compressible plastic collet for plug gauges comprising a split sleeve provided with a longitudinal passageway therethru for receiving a gauge rod, the external surfacing of said sleeve being mainly convexed and tapering from the inner end of the sleeve divergently towards the outer end, the sleeve diametrically opposite the split thereof being externally flattened in a plane parallel to the axis of the sleeve and from end to end of the sleeve, said flattened surface being wider than the split of the sleeve and directly intersecting the convex surfacing of said sleeve.

ROBERT N. TURNER.

REFERENCES CITED

The following references are of record in the file of this patent:

UNITED STATES PATENTS

| Number | Name | Date |
| --- | --- | --- |
| 493,231 | Muir | Mar. 7, 1893 |
| 827,346 | Bubb | July 31, 1906 |
| 901,063 | Bennett | Oct. 13, 1908 |
| 1,063,282 | Northrup | June 3, 1913 |
| 1,113,201 | Cummings | Oct. 13, 1914 |
| 1,626,176 | Atwood | Apr. 26, 1927 |
| 1,852,296 | Gelpoke | Apr. 5, 1932 |
| 2,000,535 | Reisch | May 7, 1935 |
| 2,173,942 | Hiatt | Sept. 26, 1939 |
| 2,345,749 | Hohwart | Apr. 4, 1944 |
| 2,345,750 | Hohwart | Apr. 4, 1944 |
| 2,375,945 | Redmer | May 15, 1945 |

OTHER REFERENCES

American Machinist, July 24, 1924, page 161.